US010210159B2

(12) United States Patent
Butterfield et al.

(10) Patent No.: US 10,210,159 B2
(45) Date of Patent: Feb. 19, 2019

(54) MEDIA OBJECT METADATA ASSOCIATION AND RANKING

(75) Inventors: Daniel Stewart Butterfield, San Francisco, CA (US); Eric Costello, Astoria, NY (US); Caterina Fake, San Francisco, CA (US); Callum James Henderson-Begg, San Francisco, CA (US); Serguei Mourachov, Sunnyvale, CA (US); Joshua Eli Schachter, Mountain View, CA (US)

(73) Assignee: OATH INC., New York, NY (US)

( * ) Notice: Subject to any disclaimer, the term of this patent is extended or adjusted under 35 U.S.C. 154(b) by 1404 days.

(21) Appl. No.: 11/350,635

(22) Filed: Feb. 8, 2006

(65) Prior Publication Data

US 2006/0242178 A1   Oct. 26, 2006

Related U.S. Application Data

(60) Provisional application No. 60/674,109, filed on Apr. 21, 2005.

(51) Int. Cl.
*G06F 7/00* (2006.01)
*G06F 17/30* (2006.01)
*G06Q 30/02* (2012.01)

(52) U.S. Cl.
CPC .. *G06F 17/30038* (2013.01); *G06F 17/30064* (2013.01); *G06Q 30/0242* (2013.01); *G06Q 30/0245* (2013.01); *G06F 17/30554* (2013.01)

(58) Field of Classification Search
CPC ................................................ G06F 17/30554
USPC ................... 707/104.1, 100, 10, 3, 4, 7, 732
See application file for complete search history.

(56) References Cited

U.S. PATENT DOCUMENTS

| 5,642,502 | A  |   | 6/1997  | Driscoll        |                |
|-----------|----|---|---------|-----------------|----------------|
| 6,526,411 | B1 |   | 2/2003  | Ward            |                |
| 6,647,130 | B2 | * | 11/2003 | Rhoads          | G06F 17/30876  |
|           |    |   |         |                 | 375/E7.026     |
| 6,697,800 | B1 | * | 2/2004  | Jannink         | G06F 17/30     |
| 6,757,661 | B1 |   | 6/2004  | Blaser et al.   |                |
| 6,813,366 | B1 | * | 11/2004 | Rhoads          | G06F 17/30876  |
|           |    |   |         |                 | 382/100        |
| 6,842,761 | B2 |   | 1/2005  | Diamond et al.  |                |
| 6,944,611 | B2 |   | 9/2005  | Flank et al.    |                |

(Continued)

FOREIGN PATENT DOCUMENTS

| EP | 1 324 227  | 7/2003 |
|----|------------|--------|
| JP | 10-028250  | 1/1998 |

(Continued)

OTHER PUBLICATIONS

Non-Final Office Action issued in connection with U.S. Appl. No. 11/350,981 dated Nov. 29, 2012.

(Continued)

*Primary Examiner* — Eliyah S. Harper
(74) *Attorney, Agent, or Firm* — James J. DeCarlo; Greenberg Traurig, LLP

(57) ABSTRACT

Metadata may be associated with media objects by providing media objects for display, and accepting input concerning the media objects, where the input may include at least two different types of metadata. For example, metadata may be in the form of tags, comments, annotations or favorites. The media objects may be searched according to metadata, and ranked in a variety of ways.

49 Claims, 4 Drawing Sheets

(56) References Cited

U.S. PATENT DOCUMENTS

| | | |
|---|---|---|
| 6,977,679 B2 | 12/2005 | Tretter et al. |
| 7,031,961 B2 | 4/2006 | Pitkow et al. |
| 7,032,178 B1 | 4/2006 | McKnight et al. |
| 7,073,193 B2 | 7/2006 | Marsh |
| 7,099,946 B2 | 8/2006 | Lennon et al. |
| 7,149,755 B2 | 12/2006 | Obrador |
| 7,181,438 B1 | 2/2007 | Szabo |
| 7,220,910 B2 | 5/2007 | Plastina et al. |
| 7,277,928 B2 | 10/2007 | Lennon |
| 7,353,214 B2 | 4/2008 | Yamanishi et al. |
| 7,440,948 B2 | 10/2008 | Trowbridge et al. |
| 7,793,326 B2 | 9/2010 | McCoskey et al. |
| 7,925,669 B2 | 4/2011 | Freeborg et al. |
| 8,200,617 B2 | 6/2012 | Spivack et al. |
| 2002/0016786 A1 | 2/2002 | Pitkow et al. |
| 2002/0032772 A1 | 3/2002 | Olstad et al. |
| 2002/0065844 A1 | 5/2002 | Robinson et al. |
| 2002/0069218 A1 | 6/2002 | Sull et al. |
| 2002/0152267 A1 | 10/2002 | Lennon |
| 2002/0194200 A1 | 12/2002 | Flank et al. |
| 2003/0036848 A1 | 2/2003 | Sheha et al. |
| 2004/0041836 A1* | 3/2004 | Zaner ................ G06Q 10/10 715/751 |
| 2004/0044661 A1 | 3/2004 | Allen et al. |
| 2004/0199657 A1 | 10/2004 | Eyal et al. |
| 2004/0230572 A1 | 11/2004 | Omoigui |
| 2004/0230676 A1 | 11/2004 | Spivack et al. |
| 2004/0267725 A1 | 12/2004 | Harik |
| 2005/0060741 A1 | 3/2005 | Tsuti et al. |
| 2005/0131866 A1 | 6/2005 | Badros et al. |
| 2005/0165757 A1 | 7/2005 | Broder |
| 2005/0165785 A1* | 7/2005 | Malkin ................ H04L 67/16 |
| 2005/0196013 A1* | 9/2005 | Rhoads ............ G06F 17/30876 382/100 |
| 2005/0210008 A1* | 9/2005 | Tran ................ G06F 17/30864 |
| 2005/0223031 A1* | 10/2005 | Zisserman et al. ........ 707/104.1 |
| 2005/0288959 A1 | 12/2005 | Eraker et al. |
| 2005/0289163 A1 | 12/2005 | Gordon et al. |
| 2006/0004732 A1 | 1/2006 | Odom |
| 2006/0004789 A1* | 1/2006 | Lunt ................ G06Q 30/02 |
| 2006/0116983 A1 | 6/2006 | Dettinger et al. |
| 2006/0129907 A1 | 6/2006 | Volk et al. |
| 2006/0184566 A1 | 8/2006 | Lo et al. |
| 2006/0200490 A1 | 9/2006 | Abbiss |
| 2006/0204142 A1* | 9/2006 | West ................ G06F 17/30864 382/305 |
| 2006/0218141 A1 | 9/2006 | Tuttle et al. |
| 2006/0224738 A1 | 10/2006 | McIntyre |
| 2006/0235843 A1 | 10/2006 | Musgrove et al. |
| 2006/0242139 A1 | 10/2006 | Butterfield et al. |
| 2007/0011155 A1 | 1/2007 | Sarkar |
| 2007/0177586 A1* | 8/2007 | Eyal et al. ................ 370/352 |
| 2007/0185858 A1 | 8/2007 | Lu et al. |
| 2007/0186267 A1 | 8/2007 | Ohde et al. |
| 2007/0208613 A1 | 9/2007 | Backer |
| 2010/0057555 A1 | 3/2010 | Butterfield et al. |
| 2012/0317110 A1 | 12/2012 | Butterfield et al. |

FOREIGN PATENT DOCUMENTS

| | | |
|---|---|---|
| JP | 10-028250 A | 1/1998 |
| JP | H10254886 | 9/1998 |
| JP | 2000-187664 A | 7/2000 |
| JP | 2000187664 | 7/2000 |
| JP | 2002-236695 A | 8/2002 |
| JP | 2003233624 | 8/2003 |
| JP | 2003256428 | 9/2003 |
| JP | 2004-193871 A | 7/2004 |
| JP | 2005-073190 A | 3/2005 |
| KR | 2001-80587 A | 8/2001 |
| KR | 2001-100702 A | 11/2001 |
| KR | 2002-84223 A | 11/2002 |
| KR | 10-2004-0065260 | 7/2004 |
| WO | WO-01/25424 A1 | 4/2001 |
| WO | WO-01/72042 A1 | 9/2001 |
| WO | WO-2006/116196 A2 | 11/2006 |

OTHER PUBLICATIONS

Official Action from the United States Patent and Trademark Office for U.S. Appl. No. 12/555,706 dated Nov. 16, 2011.
Official Action issued in connection with U.S. Appl. No. 11/350,981 dated Jul. 11, 2012.
Official Action issued in connection with U.S. Appl. No. 11/350,981 dated Apr. 12, 2011.
Official Action issued in connection with U.S. Appl. No. 11/350,981 dated Nov. 8, 2010.
Notice of Final Rejection dated Sep. 2, 2009 for Korean Patent Appln. No. 10-2007-7026966.
Notice of Preliminary Rejection dated May 11, 2011 for Korean Patent Appln. No. 10-2010-7000173.
Office Action issued in connection with U.S. Appl. No. 11/350,981 dated Jul. 20, 2010.
Non-Final Office Action dated May 29, 2009, for U.S. Appl. No. 11/350,981, filed Feb. 8, 2006, forty-two pages.
Amendment with Request for Continued Examination dated Apr. 7, 2009, for U.S. Appl. No. 11/350,981, filed Feb. 8, 2006, twenty-two pages.
Amendment After Final Action dated Feb. 25, 2009, for U.S. Appl. No. 11/350,981, filed Feb. 8, 2006, twenty pages.
Final Office Action dated Jan. 7, 2009, for U.S. Appl. No. 11/350,981, filed Feb. 8, 2006, forty pages.
Amendment Response to Non-Final Office Action dated Oct. 28, 2008, for U.S. Appl. No. 11/350,981, filed Feb. 8, 2006, twenty-three pages.
Non-Final Office Action dated Aug. 18, 2008, for U.S. Appl. No. 11/350,981, filed Feb. 8, 2006, forty-six pages.
Amendment in Response to Non-Final Office Action dated May 2, 2008, for U.S. Appl. No. 11/350,981, filed Feb. 8, 2006, twenty-three.
Non-Final Office Action dated Jan. 25, 2008, for U.S. Appl. No. 11/350,981, filed Feb. 8, 2006, thirty-three pages.
International Search Report and Written Opinion dated Aug. 30, 2007, for PCT Application No. PCT/US06/15263, filed Apr. 20, 2006.
European Search Report from European Patent Appln. No. 06751095.8 dated Feb. 3, 2011.
RandsInRepose.com. (Dec. 3, 2004). "A Del.icio.us Interview," located at <http://www.randsinrepose.com/archives/2004/12/03/a_delicious_interview.html>, last visited on Dec. 19, 2006, six pages.
Turnbull, G. (Dec. 15, 2003). "No Joshing—Fun, Useful Websites for Free," located at <http://www.manchesteronline.co.uk/business/technology/s/75/75889_no_joshing_fun_u . . . >, last visited Dec. 11, 2006, four pages.
U.S. Patent Application No. Unknown, filed Sep. 20, 2005, for Schachter.
U.S. Appl. No. 11/273,580, filed Nov. 14, 2005, for Schachter.
Wikipedia. (Nov. 27, 2006). "del.icio.us," located at <http://en.wikipedia.org/wiki/Del.icio.us>, last visited on Dec. 11, 2006, three pages.
Official Action issued in connection with U.S. Appl. No. 11/350,981 dated Feb. 15, 2012.
Official Action issued in connection with U.S. Appl. No. 12/555,706 dated Mar. 26, 2012.
English Language Translation of Notification Reason(s) for Refusal dated Aug. 1, 2011 for Japanese Patent Appln. No. 2008-507961.
Official Action from the United States Patent and Trademark Office for U.S. Appl. No. 11/350,981 dated Sep. 12, 2011.
Notice of Preliminary Rejection dated Feb. 12, 2009, for Korean Patent Application No. 10-2007-7026966, filed on Apr. 20, 2006, seven pages.
Non-Final Office Action dated Dec. 22, 2009, for U.S. Appl. No. 11/350,981, filed Feb. 8, 2006, forty-two pages.

* cited by examiner

MEDIA OBJECT METADATA ASSOCIATION AND RANKING

CROSS-REFERENCE TO RELATED APPLICATIONS

This application claims the benefit of priority to U.S. Application No. 60/674,109, filed Apr. 21, 2005, and entitled "GENERATION AND USE OF METADATA FOR MEDIA OBJECTS," which is incorporated by reference in its entirety herein.

This application is related to U.S. application Ser. No. 11/350,981, filed Feb. 8, 2006, and entitled "INTERESTINGNESS RANKING OF MEDIA OBJECTS," which is incorporated by reference in its entirety herein.

BACKGROUND OF THE INVENTION

1. Field of the Invention

The present invention generally relates to the organization and display of media objects, and particularly to the association of metadata with media objects, such as images, and the ranking thereof.

2. Description of the Related Art

Existing web sites allow users to comment upon or review media such as books or movies. However, conventional web sites are limited in the type of information concerning media objects that can be provided either directly by a user or indirectly through the user's actions, and the use of that information to generate search results.

Search results rely upon rankings of items to determine the most relevant items to be presented to the searcher. These rankings may be based upon criteria such as the number of times a particular item was "clicked on" or viewed by a user. It is desired to make available a wider variety of user-derived information concerning media objects, and to develop more relevant rankings for media objects based upon that information.

SUMMARY OF THE INVENTION

Embodiments of the present invention enable the association of metadata with a media object by providing one or more media objects for display to one or more users, and accepting input from users concerning the one or more media objects. The media object may include an image (e.g., a still or moving image) or an audio media object (e.g., a soundtrack). The input may include at least two different types of metadata, such types including tags, comments, annotations, descriptions and additions to favorites ("favoriting") or playlists ("playlisting"). The tag metadata may include location metadata. The logic implementing the embodiments herein may be located at a server, and each user may be associated with a corresponding client computer.

Embodiments of the invention may also perform a search of media objects using at least one metadatum, and rank the one or more images that return from the search. The ranking may be based at least in part on user action related to the media object, including the quantity of user-entered metadata concerning the media object, the number of users who have assigned metadata to the media object, and/or an access pattern related to the media object. The access pattern may be based at least in part upon the number of click throughs or views of the media object. The ranking may also be based at least in part on a relationship between a poster of the media object and a user who initiated the search, and/or a lapse of time related to the media object. Embodiments of the invention may base the rank at least in part on the relevance of one or more tags to the media object, where the relevance itself is based upon relevance input from one or more users.

Embodiments of the invention may include statistics logic for determining a relatedness metric based at least in part upon the frequency with which a first metadatum and a second metadatum are commonly assigned to the same media object. The statistics logic may determine clusters of related metadata based upon the metrics for multiple metadata associated with multiple media objects, and perform separate rankings of the multiple media objects within each cluster. The statistics logic may also provide the first and second metadata for display as related metadata if the determined metric exceeds a threshold relatedness value. Embodiments of the invention may determine the relevance of the first and second metadata to the media object based at least in part upon a relevance input from a user, in which case the statistics logic may vary the relatedness metric based at least in part upon the determined relevance.

Embodiments of the invention may determine the frequency with which at least one particular metadatum has been assigned to media objects over a predetermined time period, and/or determine the number of media objects to which at least one particular metadatum is assigned.

Embodiments of the invention may provide information for use by an ad server, which associates an advertisement with an image or other media object. A media object may be provided for display to a user in response to a search or other user action that may result in access to the media object. Metadata logic may accept metadata from multiple users concerning the media object. Statistics logic may determine a relatedness metric based at least in part upon the frequency with which metadata is assigned to the media object. The metadata and the metric may be made available to the ad server.

The ad server may associate the advertisement with the media object based at least in part upon the metadata and, optionally, the relatedness metric. In embodiments of the invention, the statistics logic may determine the metric based at least in part upon the frequency with which a first metadatum and a second metadatum are commonly assigned to the media object. The first and second metadata may be made available to the ad server.

DETAILED DESCRIPTION OF THE INVENTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Figure 1:
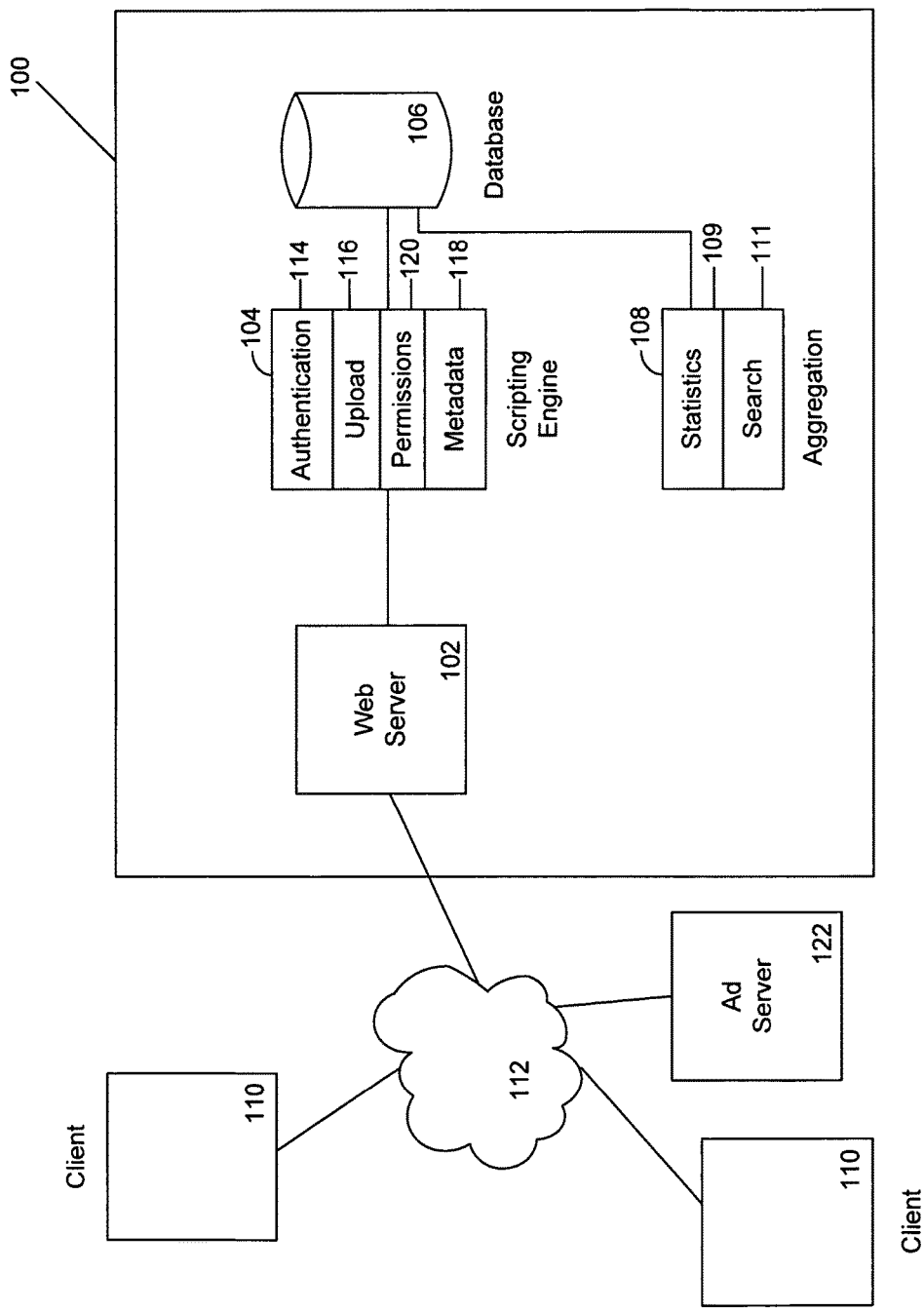
FIG. 1 illustrates a client-server system according to an embodiment of the present invention.

FIG. 1 illustrates a client-server system according to an embodiment of the present invention. A media server according to an embodiment of the invention may include http web server logic, a scripting engine (such as a PHP scripting engine), a database, and an aggregation engine. The media server may communicate with multiple clients over a network, such as the Internet.

The scripting engine may include authentication logic, upload logic, metadata processing logic, and permissions handling logic. The authentication logic authenticates a user signing on to the media server web site. The upload logic may be used to upload from the client to the server data conforming to any media format, e.g., still photograph (e.g., JPEG, TIFF), video (e.g., MPEG, AVI), or audio (e.g., MP3, OGG). The aggregation engine may include a statistics engine and a search engine. A client for use with the server of the invention may include a typical web browser application. Much of the functionality of the invention may be observed at flicker.com, which is incorporated by reference herein in its entirety.

According to an embodiment of the invention, a user at a client uses a browser to access the media server, and requests an upload of media objects. In response, the upload logic stores the media objects from the client into the database. For the sake of convenience, we will frequently use images as examples of media objects manipulated by the system, but those skilled in the art will recognize that the invention applies to other media objects, subject to appropriate modifications and use of other functions where appropriate (e.g., viewing a media object may apply to viewing a still or moving image or listening to an audio media object, such as a soundtrack).

Figure 2:
FIG. 2 is a screenshot illustrating the entry of tag metadata to a media object according to an embodiment of the present invention.
Figure 3:
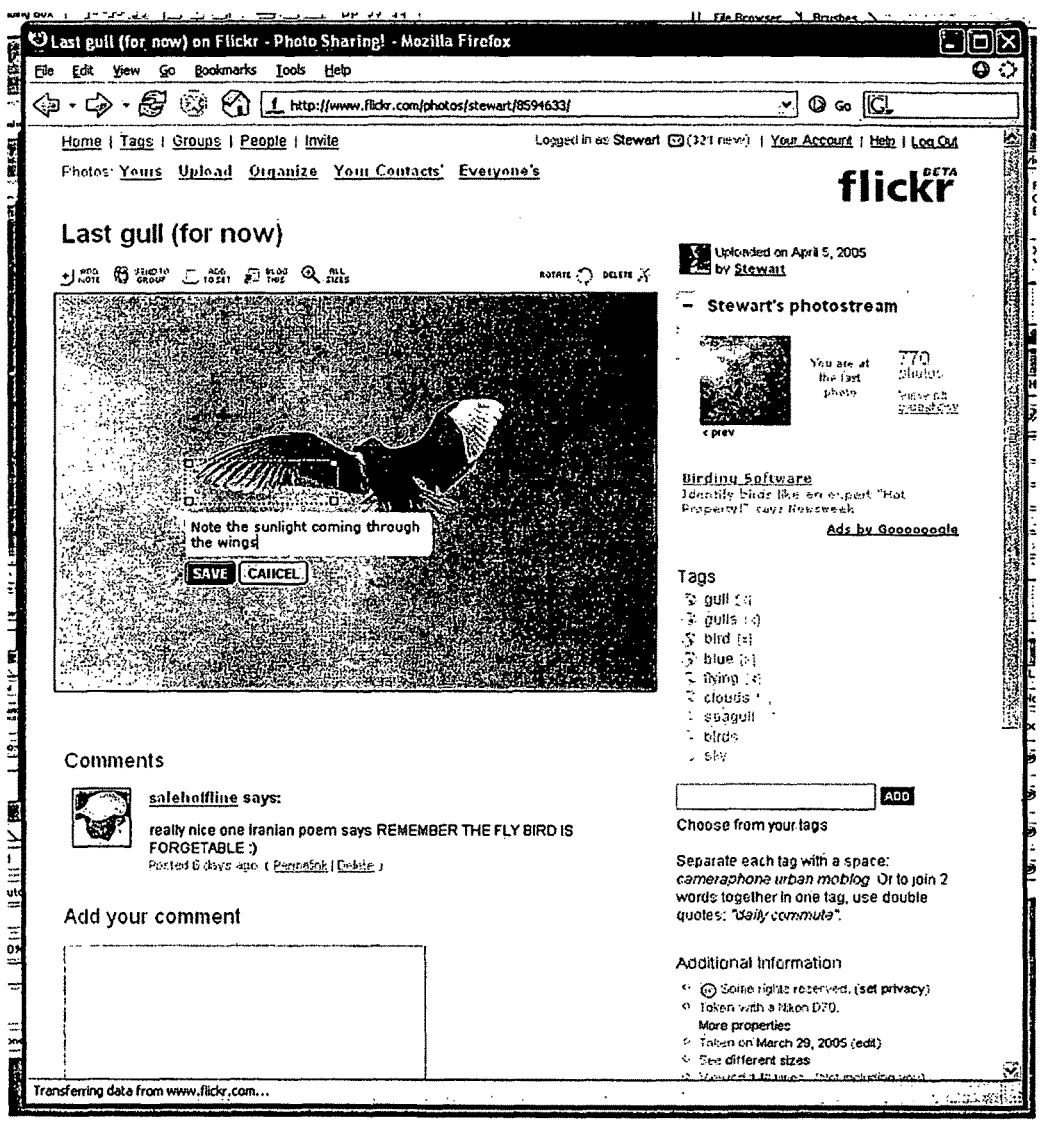
FIG. 3 illustrates adding annotation metadata according to an embodiment of the invention.

The metadata processing logic permits the user to enter metadata to describe each image. (As used herein, "metadata" may refer to one metadatum or plural metadata.) Referring to FIG. 2, the metadata may take the form of one or more tags for each image, such as four distinct tags entered as one space-delimited list "clouds seagull birds sky" for an image of a flying seagull. Other types of metadata include a title (e.g., "Last gull (for now)"), a description of the image, annotations, and comments. An annotation is a descriptive note displayed directly over a section of the image being annotated. The annotation may be hidden from view until the user passes a cursor over the annotated section. Referring to FIG. 3, for example, the user may add an annotation near the seagull's wing such as "Note the sunlight coming through the wings." A comment may be entered in a text input box similar to that used for entering comments on a message board. Multiple comments from any permitted user may be made and displayed for a media object.

Figure 4:
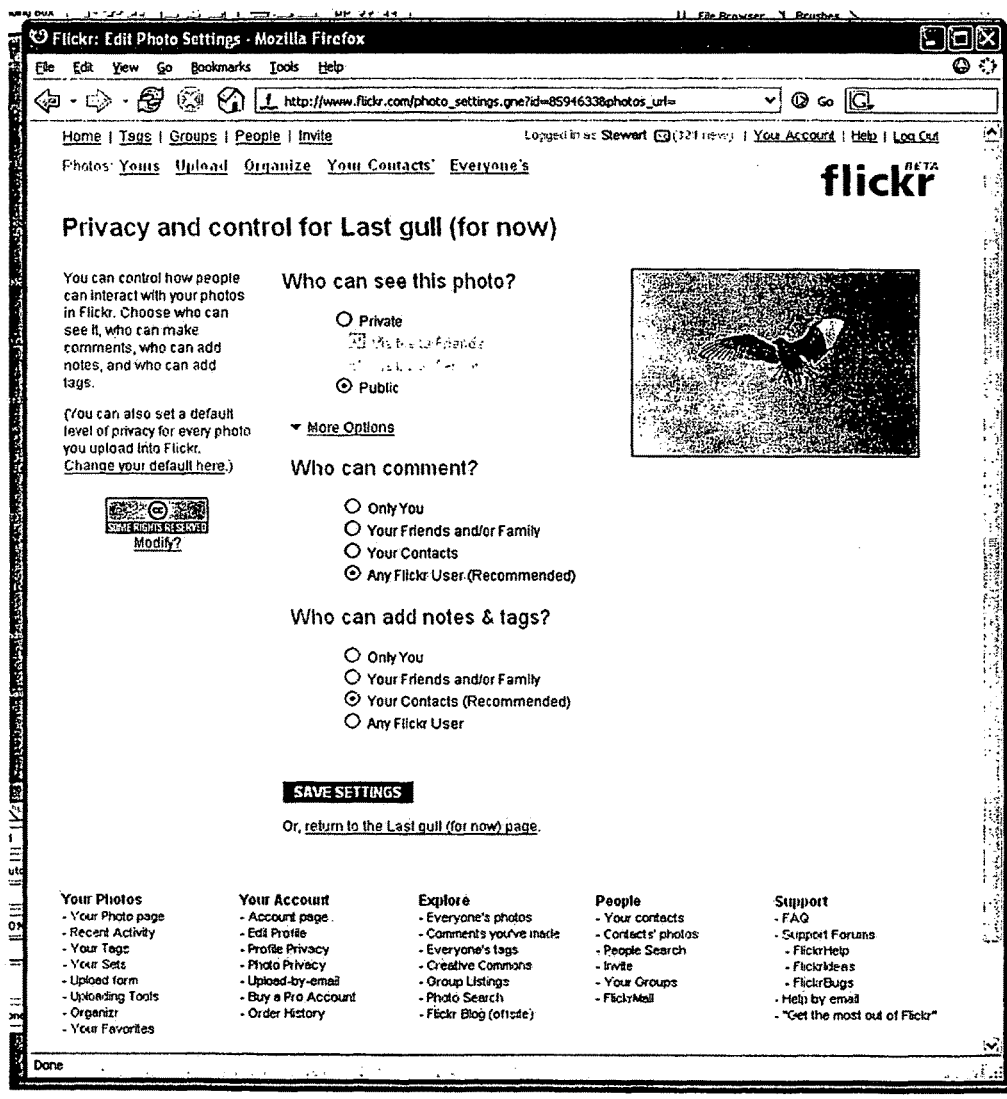
FIG. 4 illustrates setting permissions according to an embodiment of the invention.

Referring to FIG. 4, the permissions logic enables the user to set permissions concerning who is allowed to view each image. For example, the user may set the permissions to allow access only to the user herself, to a limited group of people, e.g., family and/or friends, or to the public (e.g., the entire user base). In addition, the permissions logic allows the user to permit others to provide metadata regarding each image. For example, the user may allow friends and/or family, any other user, someone from the user's contact list, or no one else, to add tags, comments (e.g., "I like the way the seagull is hovering"), or annotations.

The database enables organization of the media objects in a variety of ways. For example, a user's media objects may be organized chronologically, allowing the user to search media objects by date. This organization allows presentation of the media objects (e.g., photographic images, still images used to represent video files, or, icons representing audio files) on the user's display along a timeline or in a calendar format (e.g., with a selected image from each day displayed at the corresponding date entry). The media objects may be displayed according to the date of upload, or the date that the media object was created, pursuant to the user's display format choice. Moreover, the scripting engine allows the display of the media objects in a slide show format.

For photographs, the date of creation may be based upon device-supplied metadata, such as metadata from the camera that took the picture, including metadata regarding aperture, shutter speed and other settings. Such metadata may be extracted, for example, from the EXIF (Exchangeable Image File) header stored inside the uploaded file by many digital cameras, or the IPTC (International Press Telecommunications Council) header stored inside the uploaded file by many photo management and organization software packages. The chronological organization of photographic images may be referred to as a "photostream."

The database also permits the user to organize media objects uploaded by the user into sets identified and described by user-provided set identifiers and descriptions. Each set of images, for example, is analogous to a photo album. Each media object may belong to multiple sets. The set identifier and description themselves are also metadata.

In contrast to a set, which includes media objects from just one user, media objects from multiple users may be pooled into a "group" using the database. Each group is identified by a group identifier provided by the user who establishes the group. The grouping of all groups together represents all the media objects of a particular type (e.g., images) accessible on the media server hosting the media objects. The group creator may set various permission levels for accessing and adding media objects to the group. The permission levels may include, for example, public for the entire user base, or private for friends/family or a user-defined social network. Users permitted access to a group may also be permitted to add tags, comments and/or annotations. Similar to the display and organization of an individual user's media objects, the database enables the organization and display of group media objects in a time line or calendar format arranged by date, as well as in slide show.

The media server may include an RSS feed generator to allow a user to subscribe to a "feed" of media objects, such as media objects belonging to a particular grouping, or identified by a particular tag, that are, for example, ordered by the date they were posted. (A "grouping" may refer to any collection, such as all groups of media objects, a single group of multiple users' media objects, all of an individual user's media objects, or a set (i.e., subset) of the individual's media objects.) An RSS reader at the user's client computer may be configured so that only new media objects posted since the user last accessed the media objects (e.g., updates) will be presented to the user. Similarly, the reader may be configured so that only the most recent of a string of comments relating to a particular media object may be displayed using this feature.

The statistics engine generates statistics and other metrics based upon aggregated metadata. In one embodiment, the statistics engine determines the popularity of metadata (e.g., tags) within a grouping of media objects over a predetermined time period. For example, the statistics engine may determine the number of different users that have assigned a particular tag to one or more media objects within all groups on the system, within a single group, or within a set of media objects, over the last 24 hours. The aggregation engine may determine (and display) a histogram of the tags, and may determine the most frequently assigned tags (at any point in time or over a predetermined time period) by determining those tags either having a frequency exceeding a minimum threshold frequency or belonging to a predetermined number of the most popular tags.

In one embodiment of the invention, a predetermined number of metadata (e.g., tags) or terms within metadata (e.g., terms within comments) may have their frequency indicated by the size of the font used to display them. For example, the 100 most popular tags within all groups may be arranged on a user's display alphabetically, with increasing popularity indicated by increasing font size.

In another embodiment, the statistics engine may determine the "relatedness" of metadata, i.e., a co-occurrence measure of the frequency with which a particular metadatum (e.g., tag) (or term within a metadatum (e.g., within a comment)) is assigned to a media object along with at least one other particular metadatum (or term within a metadatum). In one embodiment, the co-occurrence measure may determine the frequency of co-occurrence of metadata of the same type. For example, out of all 100 images tagged with the word "Italy," 50 of those images may also be tagged with "Rome," 25 tagged with "Venice," 10 with "Florence," and 2 with "Sienna." The co-occurrence index would respectively be 50 for "Italy-Rome," 25 for "Italy-Venice," 10 for "Italy-Florence," and 2 for "Italy-Sienna." In summary, include location as subset of tags, Tag MD can include location.

In another embodiment, the relatedness metric may be made user-specific, so that it is a co-occurrence measure of the frequency of the number of users who have (e.g., have uploaded, or have in their user account) at least one media object assigned a particular metadatum (e.g., tag) (or term within a metadatum (e.g., a comment)) along with at least one other particular metadatum (or term within a metadatum). For example, out of all 100 users that have at least one image tagged with the word "Italy," 50 of those users may have images tagged with "Italy" also tagged with "Rome," 25 also tagged with "Venice," 10 with "Florence," and 2 with "Sienna." The co-occurrence index would respectively be 50 for "Italy-Rome," 25 for "Italy-Venice," 10 for "Italy-Florence," and 2 for "Italy-Sienna."

A predefined number of the metadata (e.g., tags) having the highest co-occurrence indices, or those having co-occurrence indices exceeding a predefined threshold, may be displayed to the user as "related" metadata (e.g., tags), with at least one metadatum (e.g., tag) not satisfying the predefined condition being displayed under "See also." The predefined threshold may be computed as a percentage of the maximum possible value of the index. All such displayed metadata may act as hyperlinks to all media objects assigned the designated metadata. The relatedness measure may be applied to all "public" media objects (i.e., those available to anyone on the system), or to smaller groupings (such as those within a group or set).

As part of the relatedness computation, the statistics engine may employ a statistical clustering analysis known in the art to determine the statistical proximity between metadata (e.g., tags), and to group the metadata and associated media objects according to corresponding cluster. For example, out of 10,000 images tagged with the word "Vancouver," one statistical cluster within a threshold proximity level may include images also tagged with "Canada" and "British Columbia." Another statistical cluster within the threshold proximity may instead be tagged with "Washington" and "space needle" along with "Vancouver." Clustering analysis allows the statistics engine to associate "Vancouver" with both the "Vancouver-Canada" cluster and the "Vancouver-Washington" cluster. The media server may provide for display to the user the two sets of related tags to indicate they belong to different clusters corresponding to different subject matter areas, for example.

An embodiment of the invention permits a user to determine the relevance of a tag to a media object, in particular to media objects posted by other users. Relevance-setting icons or other input graphics may be displayed next to each tag. For example, the icons may include "+" and "−" buttons to indicate whether the user believes that the tag is relevant or not relevant, respectively, to the displayed media object. The statistics engine may collect the relevance entries for each media object to determine a relevance metric for the object. For example, the metric may simply be the number of entered "+"s divided by the total number of relevance entries for each media object. The statistics engine associates each vote with the voting user to prevent "stuffing the ballot box," i.e., the statistics engine avoids counting multiple votes by a single user concerning the relevance of a tag to a media object.

The statistics engine may factor the relevance value into the clustering analysis to affect the relatedness metric. For example, a tag that has a low relevance value would be treated as less related to other tags associated with the same media objects (i.e., weighted to have a longer statistical distance).

The metadata processing logic 118 may compute an "interestingness" metric for each media object, according to an embodiment of the invention. Interestingness may be a function of user actions related to a media object, including, for example, the quantity of user-entered and/or user-edited metadata and/or access patterns for the media objects. Alternatively or in addition to those factors, interestingness may be a function of time, system settings, and/or the relationship of the user to the poster of the media object.

Each of the above factors may be clipped by a maximum value set by the system designer, which is one way of weighting each factor. Alternatively, or in addition, before any clipping, each factor may be more directly weighted by a weighting coefficient that multiplies the factor. In either case, the factors (whether weighted or not) may be summed together to create an interestingness score (i.e., rank). The weighting and clipping may, of course, be applied at a finer level to each parameter (described below) contributing to any of these factors.

The interestingness score may be computed for any media object for any grouping, e.g., from all groups containing the media object, from one group containing the media object, from the area of the web site associated with the poster of the media object, or from within a set of that user's media objects containing the media object being scored, for example.

The quantity of user-entered metadata may include, for example, parameters such as the number of tags, comments and/or annotations assigned to the media object, and/or the number of users who have added the media object to their favorites/bookmarks. (Adding an audio media object to a user's favorites may include adding the media object to a user's playlist.) Alternatively or in addition to those parameters, the quantity of user-entered metadata may be user-related and include, for example, the number of users who have added tags, comments and/or annotations to the media object, and/or added the media object to their favorites/bookmarks.

Alternatively or in addition to those parameters, the metadata processing logic 118 may factor into the interestingness score access patterns for the media object, such as the number of viewings (or playbacks) and/or click throughs of the media object, and/or the number of users who have viewed (or played back), and/or clicked through the media object or tags related to the media object. Whether the interestingness algorithm treats a user's action as a "click through," or, conversely, a "view" or "viewing" of a media object may depend upon the route the user took to access the media object, i.e., the access pattern. For example, a search for images assigned a particular tag may return multiple thumbnail images. The algorithm may treat a user's clicking on a particular one of those thumbnails as a "click through."

In contrast, for example, an image emailed to a user from another user may be considered to be "viewed" by the user. In another example, when a user accesses a group pool of images, the user's browser may present the images as thumbnails. The user may click on a thumbnail to "view" it. Thus, it can be seen that the identical action of clicking on a thumbnail image may be treated as a "view" or a "click through" depending upon the path the user took to reach the image, i.e., the access pattern. Based upon psychological insights, marketing research or other factors, the system designer may want to treat certain access patterns as indicating a higher degree of user interest than others, and assign such access patterns a higher weight in computing the interestingness score. As perhaps a more illustrative example, if a user reaches and clicks upon a thumbnail image based upon paying $10.00 to access the image, then the system designer is likely to assign such an access path a higher weighting coefficient than a free access of an image. Conversely, certain sources of traffic, search terms, tag queries or other precursors to the display of thumbnail images may be determined to correlate with a motivation that is inconsistent with a high interestingness, and thus the system designer is likely to assign such access paths relatively low weighting coefficients.

In addition, the metadata processing logic 118 may factor into the score the relationship of the poster of the media object to the user (e.g., a user entering a search query). A user may be a member of a private group (e.g., friends and family, an interest group, or a social network) allowed access to the poster's media objects, or a user listed in the poster's contact list, for example. Given the potentially higher likelihood of a similarity of interests between such a user and the poster relative to other users, this relationship may be weighted and summed into the interestingness score to increase it.

The above functionality is an example of "personalization" of the interestingness score. In general, the score may be based upon the identity of the requester of the interestingness score for the media object. (As used herein, reference to the "requester" or to one who requests an interestingness score or rank of a media object refers to one who explicitly requests the score, or who takes an action through any access pattern, such as entering a search query, that results in presentation of the media object along with computation of the interestingness score by the metadata processing logic 118, whether or not the score itself is provided to the requester.) In particular, the score may be based upon the relationship between the poster of the media object and a user requesting the score.

In another embodiment, the personalized score for a media object associated with a user may be based upon the number of media objects assigned the same type of metadata (e.g., tags or favorites) by that user and the score requester. The media object may be associated with the user by, for example, being assigned metadata by a user or posted by the user. For example, assume that a first user and a second user store in their on-line albums 100 and 200 photo images, respectively. The second user may search for images associated with a particular tag. The search engine 111 may return an image stored in the first user's album. The metadata processing logic 118 may assign to that image a score as an increasing function of the number of other images in the first and second users' albums that have been commonly designated as favorites or commonly tagged by the first and second users, under the theory that such shared behavior serves as a predictor that the second user may be especially interested in images in the first user's album that the second user has not yet "favorited" or tagged.

In another embodiment, the metadata processing logic 118 may compute the interestingness score based upon a location associated with the media object and with a user requesting a score for the media object. For example, the metadata processing logic 118 may indicate that a media object is more interesting to a particular user if the location associated with the media object is associated with a residence of the user (e.g., near or in the same geographic region as the user's residence), associated with a residence of another user having a predefined relationship with the user, such as a friend or family member, or associated with a location that is itself associated with a threshold number of media objects that have been assigned metadata (e.g., tagged or favorited) by the user.

In the latter case, for example, the metadata processing logic 118 may, for a particular user, positively factor into the interestingness score of an image of the Washington Monument the fact that the user has designated as favorites a large number of images associated with the Washington, D.C. area. This assumes that location metadata indicating the Washington area has been associated with the image of the Monument, e.g., by the poster of the image or another user entering the location through a tag field or separate "location" field when assigning metadata to the image.

Other interestingness score components may be set by the system designer. For example, some media objects may be treated as undesirable because they contain objectionable content such as obscene imagery or promotions of a competitor's product. The system designer may, for example, set up the score computation to decrement the thus-far accumulated score by a predetermined score offset percentage assigned to a media object having a tag or other metadata on a "blacklist." Because a media object may be associated with more than one blacklisted tag, the score offset value may be chosen to be the greatest score offset associated with those tags.

Another score component may take time into account. For example, the system designer may set up the score computation to decrement the thus-far accumulated score by a predetermined percentage over time starting at the time the media object was posted. For example, this time decay may cause the score to decrement by 2% per day from the day of posting. This and other means may be employed to prevent the occurrence of "positive feedback loops" where the sorting of media objects by interestingness itself skews the results, causing those same media objects to be more frequently accessed, thereby unnaturally increasing their interestingness scores.

The ultimate interestingness score may be normalized, so that, for example, the interestingness score always falls between 0 and 100, or 0 and 1. One way of achieving normalization is to divide the actual score value by the maximum possible score value.

The search engine 111 allows the user to search media objects in the database according to various metadata. For example, a user may conduct a boolean search of tags among all media objects accessible to the user. Alternatively, the user may perform a full-text boolean search of terms in comments, annotations, titles or descriptions. The media objects accessible to a user include, for example, public media objects, media objects within a group, media objects for which the user is a friend/family member or member of another private group, all media objects posted by the user, or the user's media objects within a user-defined set.

The media objects returned from a search may be ranked according to interestingness. For example, the media server may, in one embodiment, provide for display to the searching user only the media objects having an interestingness score above a predetermined threshold, or a predetermined number of the highest scoring media objects.

In response to a search by tag, for example, the statistics engine 109 may determine the tags (or other metadata) that are most highly related to the one or more tags (or other metadata) in the search query (according to the relatedness metric). The media server 100 may return to the user at a client the most highly related tags (or other metadata) along with the retrieved media objects. If the relatedness computation results in two clusters of related tags (or other metadata), then media objects associated with the two clusters may be ranked (and displayed) in order of interestingness.

In an advertising context, advertisements may be associated with their own metadata/keywords, such as "Rome Italy hotels tourism travel" for an Italian hotel advertisement. Based upon those related keywords, an ad server 122 may use the relatedness metric and set of related tags or other metadata provided by the media server via the web server 102 to determine which advertisements sponsoring the web site are associated with predefined metadata/keywords that most closely match the set of related tags. (The ad server may be a third-party server on the network 112.) The ad server may provide to the user for display the most closely matching advertisements. For example, the ad server may provide for display at the user's client computer the ad for Italian hotels in conjunction with the display of pictures from the media server having a set of highly related tags "Rome Italy honeymoon." In this manner, the ad server uses the relatedness metric and set of highly related tags to provide the advertisements most highly related to the displayed media objects.

In another embodiment, in response to a search by tag (or other metadatum), the statistics engine may also prevent a media object assigned a tag (or other metadatum) that has a relevance score falling below a relevance threshold from being returned as a search result.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination thereof. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. An apparatus comprising:
   a processor;
   a data storage for storing computer instructions comprising:
   logic executed by the processor for providing at least one image for display to at least one user,
   logic executed by the processor for accepting input from a plurality of users concerning the at least one image, wherein the input comprises at least two different types of metadata, wherein the user-entered metadata comprise tags,
   logic executed by the processor for updating aggregated metadata associated with the at least one image using the input, the updating comprising:
   associating a new set of tags for the at least one image based on co-occurrence indices pre-computed for each of the new set of tags, each of the co-occurrence indices representing a number of times a tag in the new set of tags and a tag in the tags are both assigned to an image, and
   determining the popularity of the tags and the new set of tags based on a number of times the tags and the new set of tags were previously associated with at least one other image in a grouping including the image and the other image;
   logic executed by the processor for updating the display of the at least one image in response to updating the aggregated metadata, the updating comprising:
   displaying tags in a first subset of the aggregated metadata, the first subset having co-occurrence indices exceeding a pre-determined threshold, and
   displaying tags in a remainder of the aggregated metadata in a separate area of the display, the remainder having co-occurrence indices below a pre-determined threshold,
   wherein each of the tags in the first subset and remainder are displayed along with a relevance-setting icon;

logic executed by the processor for detecting a selection of a tag in the first subset or the remainder, the selection causing the processor to generate a search query for the selected tag using the selected tag as a search term in the search query; and logic executed by the processor for detecting a second selection of a relevance-setting icon associated with the tag, the second selection causing the processor to increase a respective co-occurrence index associated with the tag and at least one other tag.

2. The apparatus of claim 1, wherein the at least two different types of metadata are selected from a group of metadata types consisting of: tags, comments, descriptions, favorites and annotations.

3. The apparatus of claim 2, wherein the tags include location metadata.

4. The apparatus of claim 1, wherein the at least one image comprises video images.

5. The apparatus of claim 1, wherein the apparatus is located at a server, and each user is associated with a corresponding client.

6. The apparatus of claim 1, wherein the logic for ranking ranks an image based at least in part on user action related to the at least one image.

7. The apparatus of claim 1, wherein the user-entered metadata are selected from a group of metadata types consisting of: tags, comments, and annotations.

8. The apparatus of claim 1, wherein the logic for ranking ranks an image based at least in part on the number of users who have assigned metadata to the at least one image.

9. The apparatus of claim 8, wherein the user-entered metadata is based at least in part upon the number of users who have designated the at least one image as a favorite.

10. The apparatus of claim 1, wherein the logic for ranking ranks the at least one image based at least in part on an access pattern related to the at least one image.

11. The apparatus of claim 10, wherein the access pattern is based at least in part upon the number of click throughs of the at least one image.

12. The apparatus of claim 10, wherein the access pattern is based at least in part upon the number of views of the at least one image.

13. The apparatus of claim 6, wherein the logic for ranking ranks the at least one image according to a lapse of time related to the at least one image.

14. The apparatus of claim 13, wherein the lapse of time related to the at least one image is the lapse of time since the at least one image was uploaded.

15. The apparatus of claim 1, wherein the logic for ranking ranks the at least one image based at least in part upon the relationship between a poster of the at least one image and a user who initiated the search.

16. The apparatus of claim 1, wherein the computer instructions comprise statistics logic for determining a metric based at least in part upon the frequency with which a first metadatum and a second metadatum are commonly assigned to the same image.

17. The apparatus of claim 16, wherein the statistics logic is logic for:
determining clusters of related metadata based upon the metrics for multiple metadata associated with multiple images; and
ranking the associated multiple images within each cluster.

18. The apparatus of claim 16, wherein the first and second metadata are tags.

19. The apparatus of claim 16, wherein the statistics logic is logic for providing the first and second metadata for display as related metadata if the determined metric exceeds a threshold relatedness value.

20. The apparatus of claim 16, wherein the computer instructions comprise logic for determining the relevance of the first and second metadata to the image based at least in part upon the relevance input from the at least one user, wherein the statistics logic is logic for varying the metric based at least in part upon the determined relevance.

21. The apparatus of claim 1, wherein the computer instructions comprise logic for determining the frequency with which at least one particular metadatum has been assigned to images over a predetermined time period.

22. The apparatus of claim 21, wherein the at least one metadatum comprises at least one tag.

23. The apparatus of claim 1, wherein the computer instructions comprise logic for determining the number of images to which at least one particular metadatum is assigned.

24. A method comprising:
providing, by a computing device, at least one image for display to at least one user;
accepting, by the computing device, input from a plurality of users concerning the at least one image, wherein the input comprises at least two different types of metadata and wherein the user-entered metadata comprise tags;
updating, by the computing device, aggregated metadata associated with the at least one image using the input, the updating comprising:
associating a new set of tags for the at least one image based on co-occurrence indices pre-computed for each of the new set of tags, each of co-occurrence indices representing a number of times a tag in the new set of tags and a tag in the tags are both assigned to an image, and
determining the popularity of the tags and the new set of tags based on a number of times the tags and the new set of tags were previously associated with at least one other image in a grouping including the image and the other image;
updating the display of the at least one image in response to updating the aggregated metadata, the updating comprising:
displaying tags in a first subset of the aggregated metadata, the first subset having co-occurrence indices exceeding a pre-determined threshold, and
displaying tags in a remainder of the aggregated metadata in a separate area of the display, the remainder having co-occurrence indices below a pre-determined threshold,
wherein each of the tags in the first subset and remainder are displayed along with a relevance-setting icon;
detecting a selection of a tag in the first subset or the remainder, the selection causing the processor to generate a search query for the selected tag using the selected tag as a search term in the search query; and
detecting a second selection of a relevance-setting icon associated with the tag, the second selection causing the processor to increase a respective co-occurrence index associated with the tag and at least one other tag.

25. The method of claim 24, wherein the at least two different types of metadata are selected from a group of metadata types consisting of: tags, comments, descriptions, favorites and annotations.

26. The method of claim 24, wherein providing at least one image and accepting input occur at a server, and each user is associated with a corresponding client.

27. The method of claim 24, wherein ranking comprises ranking an image based at least in part on user action related to the at least one image.

28. The method of claim 24, wherein the user-entered metadata are selected from a group of metadata types consisting of: tags, comments and annotations.

29. The method of claim 24, wherein ranking comprises ranking an image based at least in part on the number of users who have assigned metadata to the at least one image.

30. The method of claim 29, wherein the user-entered metadata is based at least in part upon the number of users who have designated the at least one image as a favorite.

31. The method of claim 24, wherein ranking further comprises ranking the at least one image based at least in part on an access pattern related to the at least one image.

32. The method of claim 27, wherein ranking further comprises ranking the at least one image according to a lapse of time related to the at least one image.

33. The method of claim 24, wherein ranking comprises ranking the at least one image based at least in part upon the relationship between a poster of the at least one image and a user who initiated the search.

34. The method of claim 24, further comprising determining a metric based at least in part upon the frequency with which a first metadatum and a second metadatum are commonly assigned to the same image.

35. The method of claim 34, wherein determining a metric further comprises:
  determining clusters of related metadata based upon the metrics for multiple metadata associated with multiple images; and
  ranking the associated multiple images within each cluster.

36. The method of claim 34, further comprising providing the first and second metadata for display as related metadata if the determined metric exceeds a threshold relatedness value.

37. A non-transitory computer readable storage medium comprising computer-executable program code executable by a processor for:
  providing, by the processor, at least one image for display to at least one user;
  accepting, by the processor, input from a plurality of users concerning the at least one image, wherein the input comprises at least two different types of metadata, wherein the user-entered metadata comprise tags;
  updating, by the processor, aggregated metadata associated with the at least one image using the input, the updating comprising:
    associating a new set of tags for the at least one image based on co-occurrence indices pre-computed for each of the new set of tags, each of co-occurrence indices representing a number of times a tag in the new set of tags and a tag in the tags are both assigned to an image, and
    determining the popularity of the tags and the new set of tags based on a number of times the tags and the new set of tags were previously associated with at least one other image in a grouping including the image and the other image;
  updating, by the processor, the display of the at least one image in response to updating the aggregated metadata, the updating comprising:
    displaying tags in a first subset of the aggregated metadata, the first subset having co-occurrence indices exceeding a pre-determined threshold, and
    displaying tags in a remainder of the aggregated metadata in a separate area of the display, the remainder having co-occurrence indices below a pre-determined threshold,
    wherein each of the tags in the first subset and remainder are displayed along with a relevance-setting icon;
  detecting, by the processor, a selection of a tag in the first subset or the remainder, the selection causing the processor to generate a search query for the selected tag using the selected tag as a search term in the search query; and
  detecting, by the processor, a second selection of a relevance-setting icon associated with the tag, the second selection causing the processor to increase a respective co-occurrence index associated with the tag and at least one other tag.

38. The non-transitory computer readable storage medium of claim 37, wherein the at least two different types of metadata are selected from a group of metadata types consisting of: tags, comments, descriptions, favorites and annotations.

39. The non-transitory computer readable storage medium of claim 37, wherein providing at least one image and accepting input occur at a server, and each user is associated with a corresponding client.

40. The non-transitory computer readable storage medium of claim 37, wherein ranking comprises ranking an image based at least in part on user action related to the at least one image.

41. The non-transitory computer readable storage medium of claim 37, wherein the user-entered metadata are selected from a group of metadata types consisting of: tags, comments and annotations.

42. The non-transitory computer readable storage medium of claim 37, wherein ranking comprises ranking an image based at least in part on the number of users who have assigned metadata to the at least one image.

43. The non-transitory computer readable storage medium of claim 42, wherein the user-entered metadata is based at least in part upon the number of users who have designated the at least one image as a favorite.

44. The non-transitory computer readable storage medium of claim 37, wherein ranking further comprises ranking the at least one image based at least in part on an access pattern related to the at least one image.

45. The non-transitory computer readable storage medium of claim 40, wherein ranking further comprises ranking the at least one image according to a lapse of time related to the at least one image.

46. The non-transitory computer readable storage medium of claim 37, wherein ranking comprises ranking the at least one image based at least in part upon the relationship between a poster of the at least one image and a user who initiated the search.

47. The non-transitory computer readable storage medium of claim 37, further comprising program code for determining a metric based at least in part upon the frequency with which a first metadatum and a second metadatum are commonly assigned to the same image.

48. The non-transitory computer readable storage medium of claim 47, wherein the program code for determining a metric further comprises code for:

determining clusters of related metadata based upon the metrics for multiple metadata associated with multiple images; and ranking the associated multiple images within each cluster.

49. The non-transitory computer readable storage medium of claim 47, further comprising program code for providing the first and second metadata for display as related metadata if the determined metric exceeds a threshold relatedness value.

\* \* \* \* \*